A. BRIGDEN.
INSECT CATCHER.
APPLICATION FILED JULY 13, 1921.
1,414,069. Patented Apr. 25, 1922.
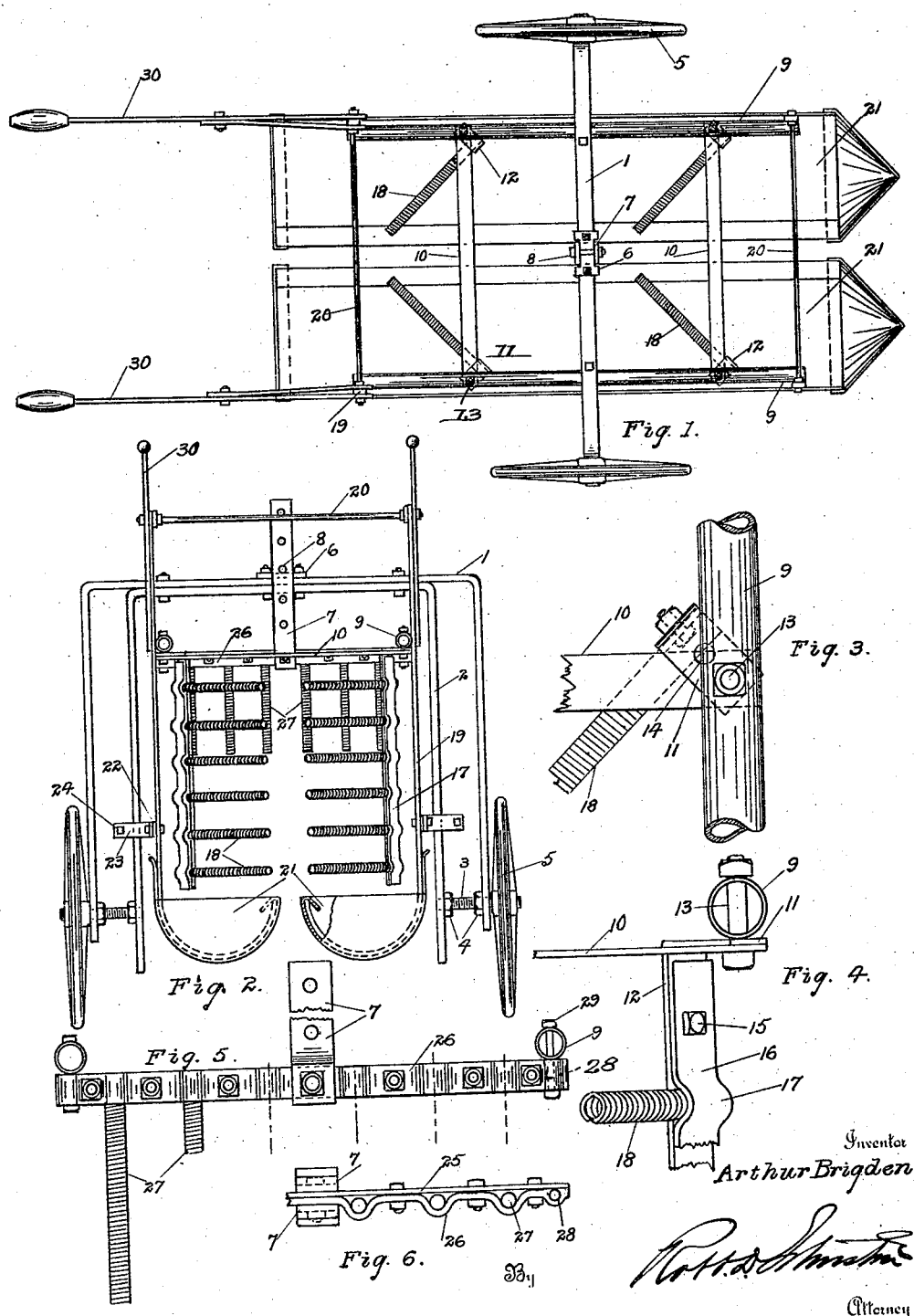
Inventor
Arthur Brigden.
Attorney

UNITED STATES PATENT OFFICE.

ARTHUR BRIGDEN, OF BIRMINGHAM, ALABAMA.

INSECT CATCHER.

1,414,069.

Specification of Letters Patent.  Patented Apr. 25, 1922.

Application filed July 13, 1921. Serial No. 484,490.

*To all whom it may concern:*

Be it known that I, ARTHUR BRIGDEN, a citizen of the United States of America, residing at Birmingham, in the county of Jefferson and State of Alabama, have invented certain new and useful Improvements in Insect Catchers, of which the following is a specification.

My invention relates to insect catchers of the type comprising a wheel supported frame carrying spaced collecting troughs and mechanism in the frame for dislodging the insects from the plants and causing them to fall into the troughs.

More particularly my present invention is an improvement on the insect catcher forming the subject matter of my pending application, Serial No. 476,414, filed the 10th day of June, 1921, and the chief objects of this invention are to simplify and perfect the U-shaped frame from which the shaking and collecting mechanism is suspended and to improve the type of plant shaking fingers by the utilization of tightly coiled springs.

A further object is to improve the manner of mounting and setting these springs both across the top of the frame and in diagonal relationship on each side of the frame.

These and other novel features of my invention will be best understood by reference to the accompanying drawings which form a part of this specification, and in which:—

Fig. 1 is a plan view of my improved machine.

Fig. 2 is a rear end elevation of Fig. 1.

Fig. 3 is an enlarged detail plan view of the manner of connecting the side spring supports to the suspended frame.

Fig. 4 is an elevation of Fig. 3 with the spring support broken away.

Fig. 5 is a detail view of the center transverse overhead spring support with part only of the springs in position.

Fig. 6 is a partial plan view of the overhead spring support.

Similar reference numerals refer to similar parts throughout the drawings.

The machine comprises a main wheel supported frame composed of two U-shaped bent metal bars 1 and 2 bolted together overhead and having their adjacent side members at each side of the machine disposed in vertical spaced parallelism and connected at their lower ends by an axle bolt 3 which is screwed into both and carries jam nuts 4 to rigidly connect the side frame members in spaced relationship on the bolt which, on its overhung end, supports a wheel 5. In the center of the top of the support frame I mount a guide plate 6 notched on opposite sides which overhang the frame members and form guides for the U-shaped strap 7, which at its lower end supports the collecting frame and which is provided with a series of bolt holes for the reception of a bolt 8 which passing across the top of the plate 6 and can be moved to adjust the height at which the suspended frame is supported.

The suspended frame proper comprises a pair of parallel overhead side pipes 9 which are cross connected at intervals by cross bars 10. These cross bars are disposed under the pipes 9, as shown in Figs. 3 and 4, and have interposed between each of their ends and the pipes 9 the upper angled end 11 of a spring support bar 12. A single bolt 13 is utilized to connect each spring support and cross bar to a pipe 9 and it will be observed that the angled end 11 of the spring support is provided with an extra bolt hole 14 which if used to receive bolt 13 enables the support 12 to be set parallel with the cross bar 10 instead of at an angle thereto as shown in Fig. 3 where the outer bolt hole in the end 11 is used for bolt 13. The support bar 12 is a straight bar which hangs vertically and has connected thereto by bolts 15 a spring clamp plate 16 provided at intervals with pockets 17, each shaped to receive a tightly coiled spring 18 which will form a shaker finger. I attach to the forward and rear ends of the pipes 9 upright bars 19 which project above the pipes 9 and each adjacent pair is cross-connected overhead by a screw bolt 20 with set nuts on each end which by drawing the upper ends of these bars together or spreading them apart will cause their lower ends to approach or spread apart so as to obtain the necessary adjustment for the collecting troughs 21 which are supported by the bottom curved ends of these bars. The forward and rear bars 19 on the same side of the frame are connected by longitudinal side bars 22 and at the center of each of these bars I attach a yoke frame 23 which embraces the adjacent side leg of the inner U-shaped frame member 2, holding the suspended frame from swinging from front to rear but leaving it free for the desired lateral play limited, however, by bolts 24 in the outer ends of the yokes. This method of adjustably supporting the frame and of adjustably supporting the troughs forms part of my other application and is not claimed herein.

Across the center of the suspended frame I provide a spring support shown in Figs. 5 and 6, which comprises a straight bar 25 and a spring clamp bar 26, both of which are disposed with the wide faces in vertical planes so as to support the vertical depending spring shaker fingers 27. The strap 7 is contracted at its lower end and bolted to the center of these two bars 25 and 26, as shown more clearly in Fig. 6, and at the outer ends of the plate 26 I provide seats 28 to receive bolts 29 which attach this center spring support to the pipes 9. The spring supporting bars are flexible and attached only overhead so that they can yield and thus reduce the chance of injury to the plants. The suspended frame is provided with handles 30 which are suitably connected and braced to its rear end, thus enabling it to be rocked about its axial supports in order to give the forward ends of the troughs the desired elevation.

It is to be understood that, if desired, the present shaker equipment may have incorporated with it the other shaking and collecting media disclosed in my pending application aforesaid.

In operation, having adjusted the troughs by the position of the nuts on the bolts 20 and having set the spring supports 12 and 25 in operating position, the apparatus is ready for use, the collecting frame being free to swing laterally from the hanger 7 and to be rocked in a longitudinal plane about the wheel axes so as to accommodate it to the row of plants. As the plants pass between the troughs they are engaged by the spring shaker fingers 18 and 27 and the fingers on the several hanger spring supports 12 can be disposed in any desired relative relationship so as to insure all portions of the plants being struck and effectively shaken while traversing the machine. The insects dislodged by the shaker fingers on the plants will be collected by the troughs and can be destroyed in any well known manner.

The frame construction is light, flexible and comparatively inexpensive and by relieving the operator of the burden of carrying the apparatus or of manipulating a four wheeled support therefor, I reduce the weight, friction and cost to a minimum and provide a machine which an operator can handle without exhaustion.

This invention is not intended to be restricted in scope to the specific embodiments shown, but contemplates such modifications as come within the spirit and scope of the claims.

Having thus described my invention, what I claim as new and desire to secure by Letters Patent, is:—

1. In an insect catcher, a frame work having spaced collecting troughs at the bottom and a number of vertical spring bars attached only at their upper ends to the frame, and having spring fingers projecting horizontally inwardly therefrom above the troughs.

2. An insect catcher in accordance with claim 1, in which the frame comprises transverse top members which said spring bars are bent to overlie, and means to detachably connect the bars to said cross members.

3. An insect catcher in accordance with claim 1, in which each spring bar is mounted by a single attaching bolt to permit the fingers thereon to be swung about the bolt into and out of operating position and to be clamped thereby in the desired adjusted position.

4. In an insect catching machine, a portable frame comprising overhead members, vertically disposed flexible shaker supporting bars attached only overhead in said frame, and a vertical series of inwardly and horizontally disposed spring shaker fingers connected to each support.

5. In an insect catching machine of the character described in claim 4, in which each of said supports comprises metallic bars, one of which is angled at its top for connection by a vertical pivot bolt to the frame and the other of which is shaped to receive the row of spring fingers to be carried by said support, and means to clamp the two bars of each support together.

6. In an insect catcher, a top frame comprising longitudinal side members and cross connections, vertical spring supports having their upper ends angled and interposed between the cross connections and to said bars, and a bolt connecting said three elements together, the angled end of the spring support having a bolt hole therethrough sufficiently spaced from its vertical body portion to permit it to rock about the bolt as a vertical axis to set diagonally of the frame, and means to clamp the spring fingers to said spring supports.

In testimony whereof I affix my signature.

ARTHUR BRIGDEN.

Witness:
NOMIE WELSH.